Patented Sept. 10, 1940

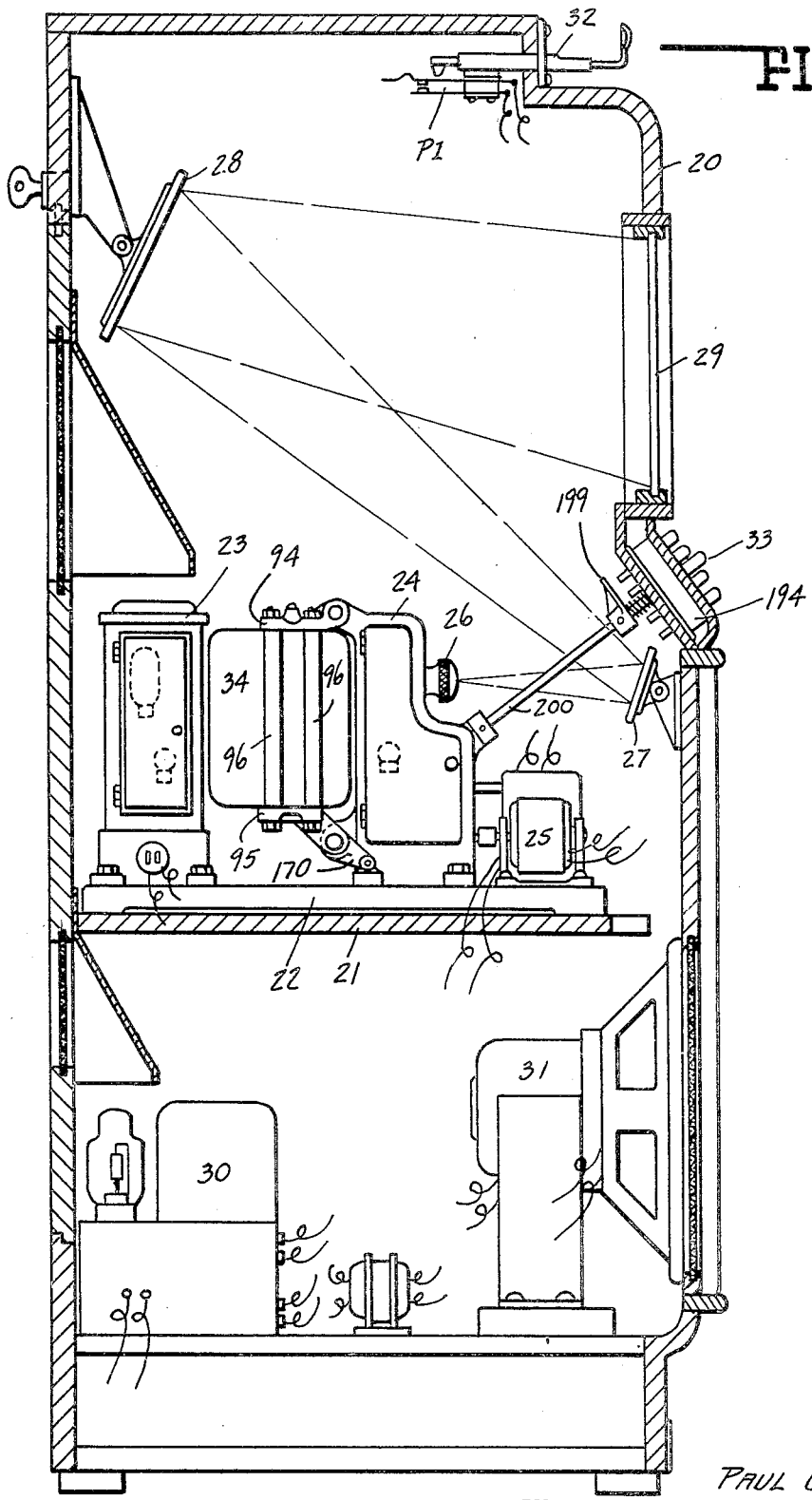

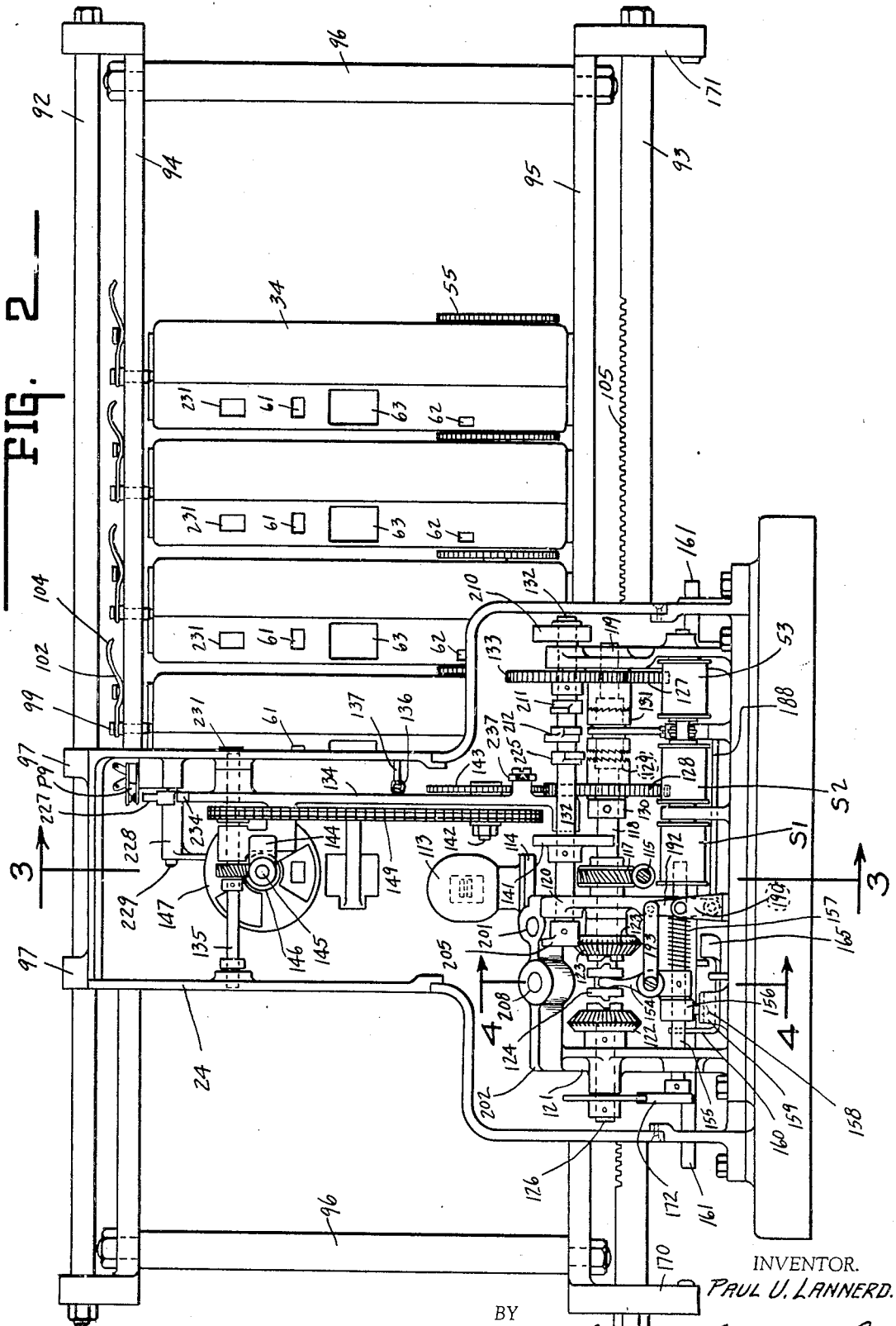

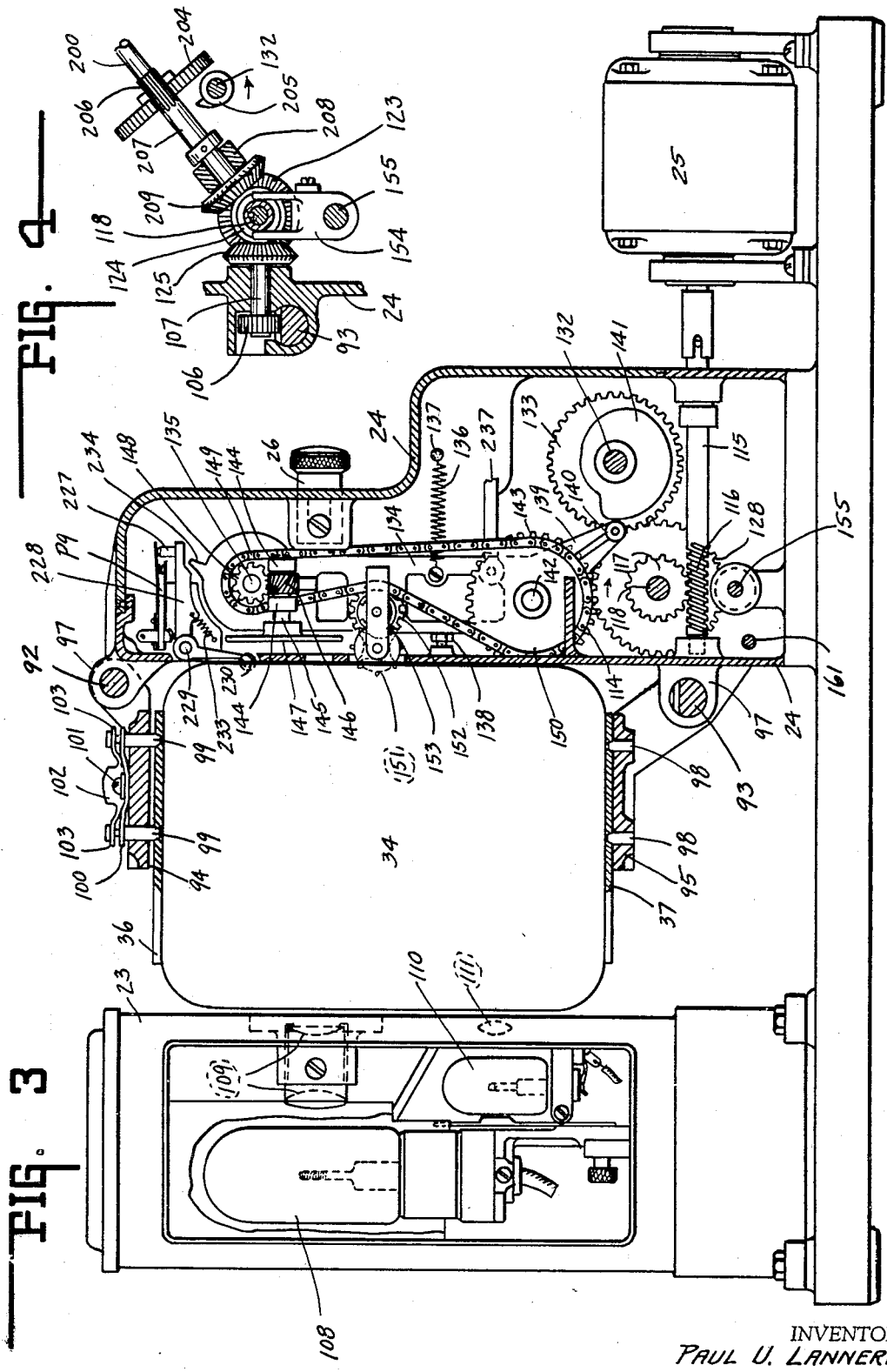

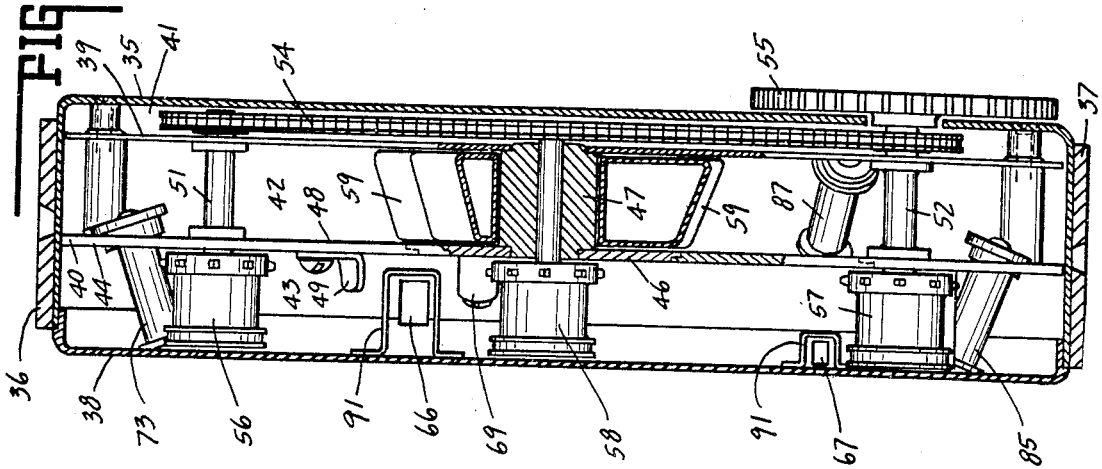
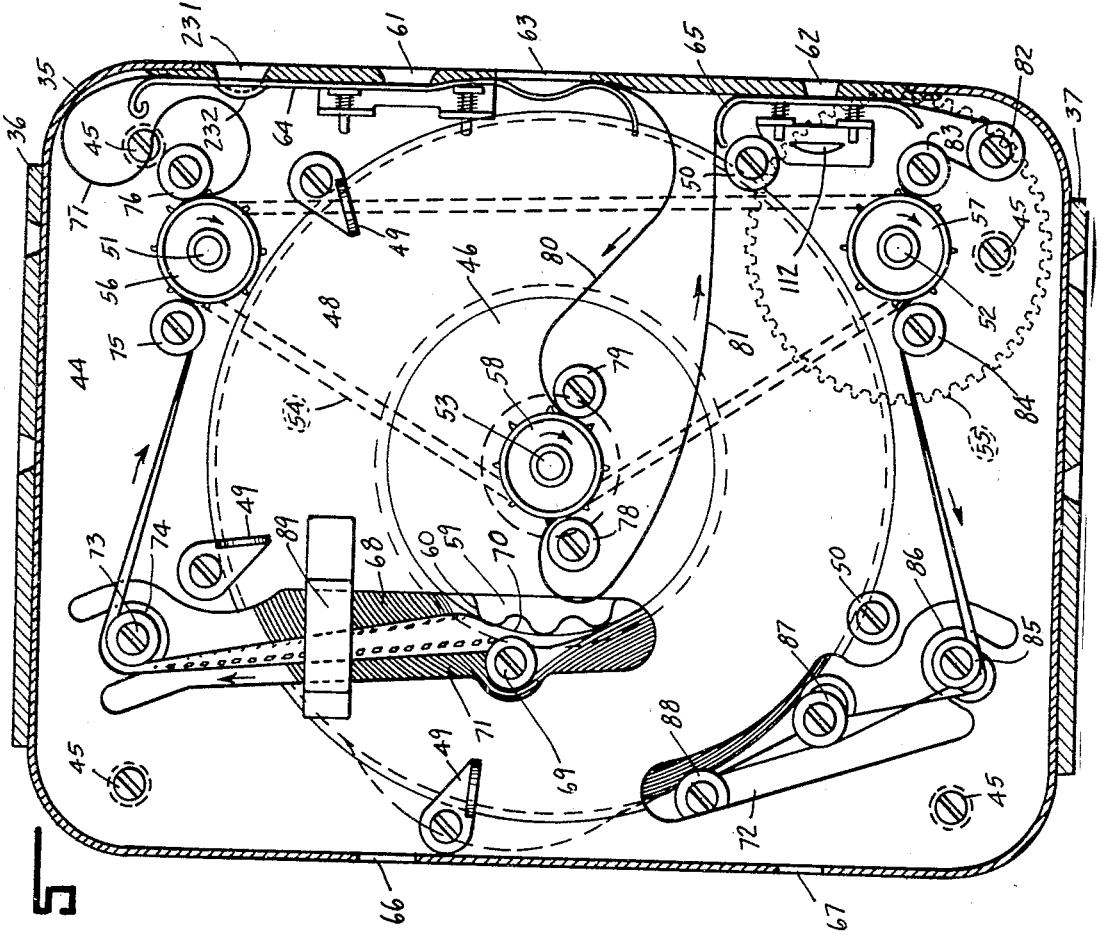

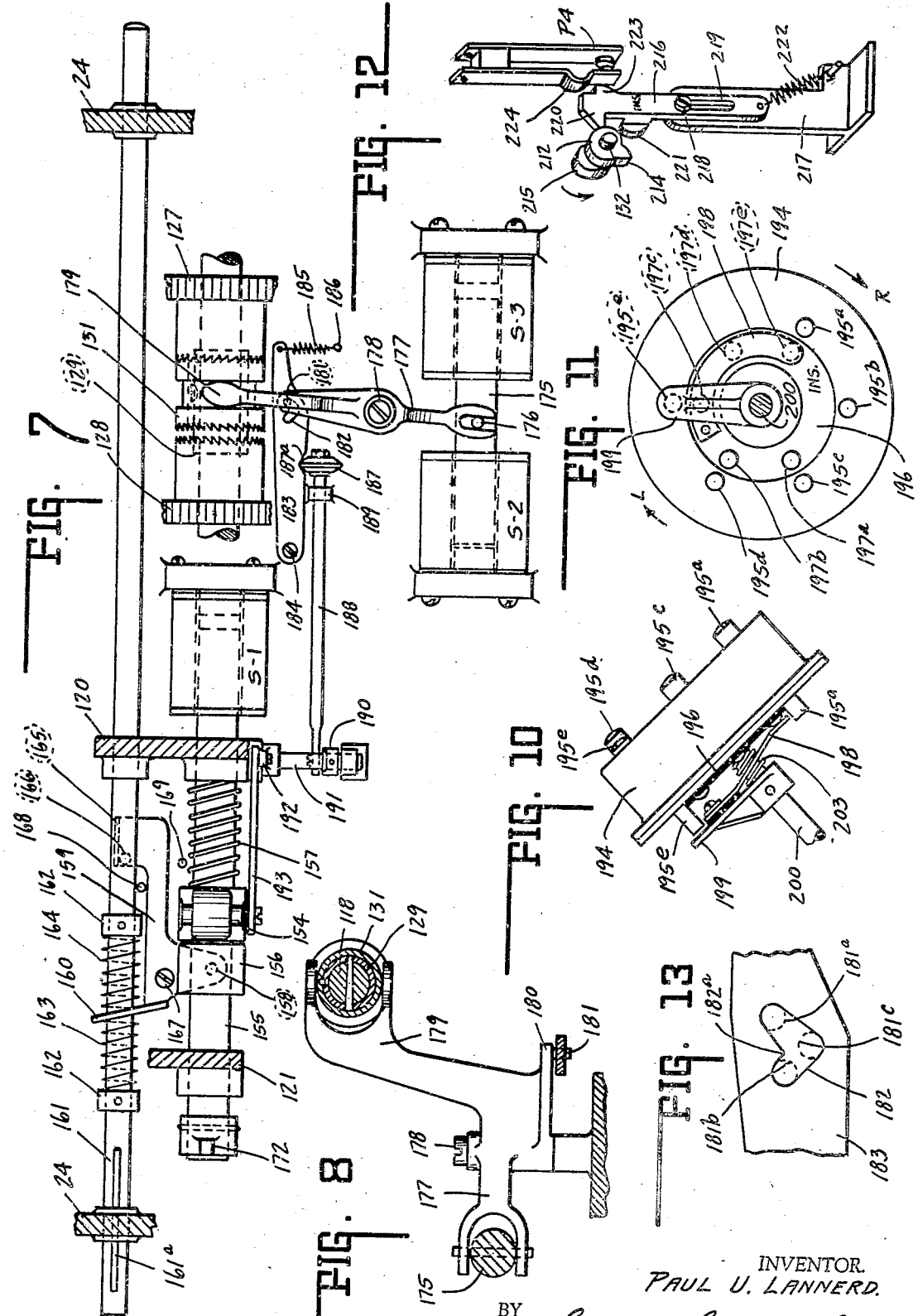

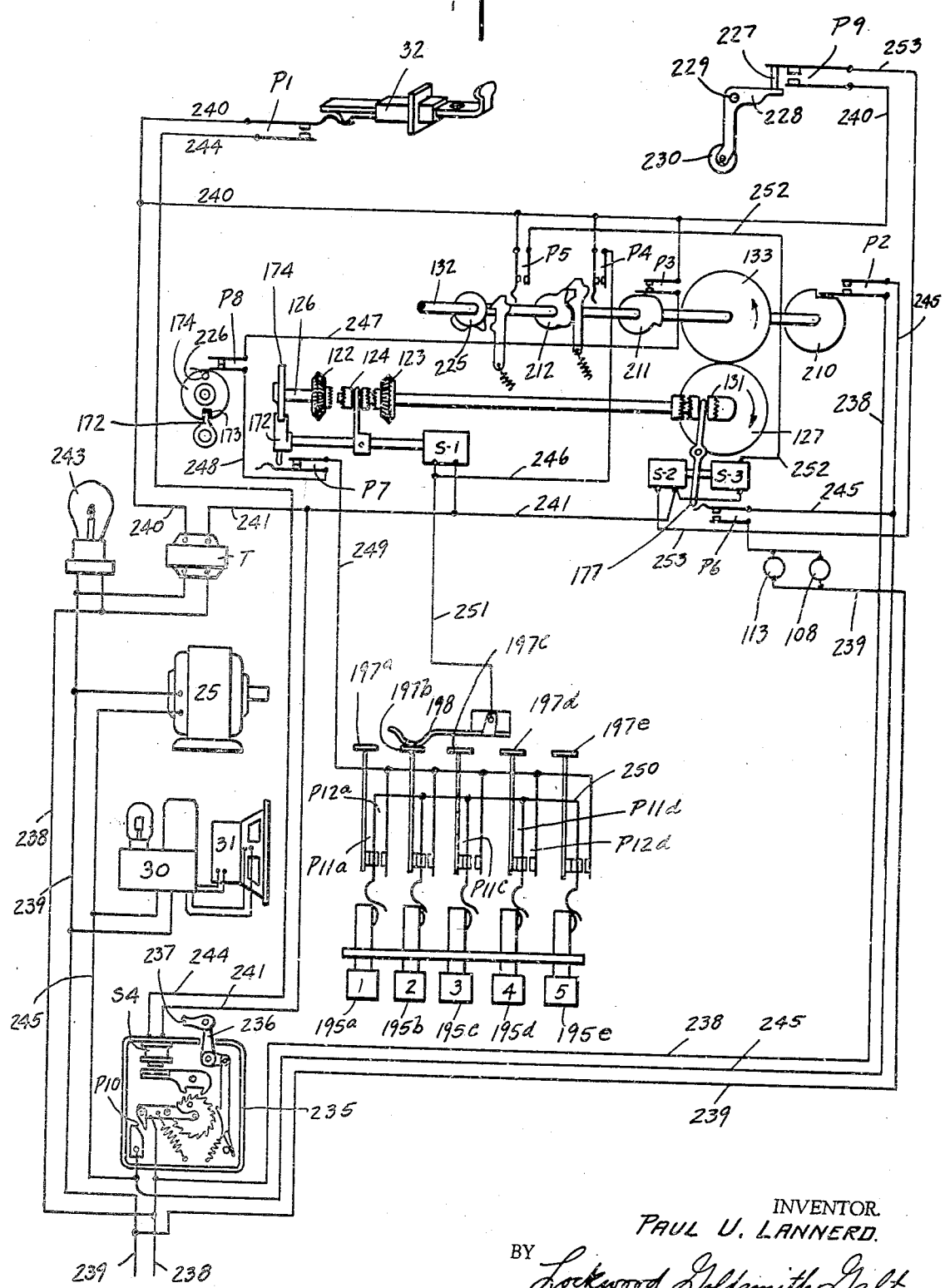

2,214,468

UNITED STATES PATENT OFFICE 2,214,468

PROJECTION DEVICE

Paul U. Lannerd, North Tonawanda, N. Y., assignor to The Rudolph Wurlitzer Company, Cincinnati, Ohio, a corporation of Ohio Application September 26, 1938, Serial No. 231,702

18 Claims. (Cl. 88—28)

This invention relates to a projection device for film records carrying either visual images or sound tracks or both.

One object of the invention is to provide apparatus by means of which a plurality of individual films each contained in an individual magazine may be brought either selectively or in a predetermined sequence into position for reproducing the material recorded thereon.

Another object of the invention is to provide a projecting machine by means of which a plurality of films may be selectively or successively shown with a minimum of time consumed between the showing of films.

Another object of the invention is to provide an automatic projector suitable for operation by those not skilled in the care and operation of present day projectors.

To accomplish these and other objects, the invention provides a plurality of individual film magazines each provided with film moving mechanism and with suitable light apertures past which the film may be moved. Each magazine contains an individual film, preferably of the endless type, which is always properly threaded with the movable parts of the magazine. By this means, when it is desired to show a given film, it is only necessary to bring its magazine into proper operative relation to the projecting parts of the machine either by moving the magazine or by moving the projecting parts and then to couple the moving parts of the magazine to a source of power for running the film. With the endless type of film herein shown, rewinding is unnecessary, a given film being instantly ready for a second showing upon completion of a first showing.

The invention also provides means for manipulating the magazines to bring the same to operative position either successively or by preselection.

Other features of the invention reside in apparatus provided for the automatic control of the magazine manipulating mechanism.

Other objects and features of the invention will be understood from the accompanying drawings and the following description and claims:

Fig. 1 is an elevational view of a projecting machine embodying the invention and mounted in a suitable cabinet, the cabinet being shown in section. Fig. 2 is a front elevational view of the projecting and magazine manipulating mechanism. Fig. 3 is a vertical sectional view taken substantially on the line 3—3 of Fig. 2. Fig. 4 is a sectional view taken substantially on the line 4—4 of Fig. 2. Fig. 5 is an elevational view of one of the film magazines with the cover thereof removed and with parts in section. Fig. 6 is an end view of the magazine with parts shown in section. Fig. 7 is a plan view of certain mechanism used for controlling the magazine manipulating and projecting operation. Fig. 8 is a side elevational view of a part of the mechanism shown in Fig. 7. Fig. 9 is a diagram of one form of wiring connections and associated switch operating parts which may be used in carrying out the invention. Fig. 10 is a side view of a preselector unit. Fig. 11 is a rear view of the same. Fig. 12 is a perspective view of a form of cam operated switch which may be used for controlling certain electrical operations. Fig. 13 is a detailed view in plan and on an enlarged scale of a portion of the apparatus of Fig. 7.

In the preferred form of the invention shown in the drawings by way of illustration, there is provided a cabinet 20 within which there is located a shelf 21 supporting a base plate 22 in turn carrying a projector housing 23, a casing 24 which houses the magazine manipulating mechanism, and a motor 25 for driving the same. The casing 24 carries an optical system 26 which projects the visual images from the moving picture film first onto a mirror 27 mounted on the front wall of the cabinet, then to a mirror 28 mounted on the rear wall of the cabinet and then to a translucent screen 29 mounted in a suitable opening in the front of the cabinet. The screen is of course visible to an observer standing at the front of the cabinet. Within the cabinet there is also provided an amplifier 30 and a speaker 31. A coin receiving device 32 of any well known form is provided when coin control is desired. A selector unit 33 for preselecting the film records to be shown is mounted on the front of the cabinet accessible to an operator.

Magazines

Each of the magazines 34 preferably used with the invention consists of a substantially rectangular casing 35 having a top plate 36 and a bottom plate 37 secured thereto, as best seen in Figs. 5 and 6. A cover 38 is provided to close the magazine and may be suitably secured in place. The casing is divided by partitions 39 and 40 into three compartments 41, 42 and 43. The partition 39 consists of a single plate suitably secured in place while the partition 40 consists of a fixed outer plate 44 secured to plate 29 by screws 45, a fixed central plate 46 secured to a bushing 47 in turn mounted on the plate 39, and an annular plate 48 removably secured to plate 46 by latches 49 and screws 50.

Sprocket shafts 51 and 52 are suitably journaled on plates 39 and 44, and a sprocket shaft 53 is journaled in the bushing 47. Within the compartment 41 each of said shafts carries a suitable sprocket about which there is trained a sprocket chain 54. The shaft 52 extends outside of the casing 35 and carries a gear 55 which may be driven by a suitable gear meshing therewith to rotate the three sprocket shafts 51, 52 and 53. Within the compartment 43 the shafts 51, 52 and 53 have secured thereto film driving sprockets 56, 57 and 58 respectively. Within the compartment 42 there is freely mounted on the bushing 47 a film receiver 59 in the form of a hollow core, generally frusto-conical in shape and having its sides provided with ridges or corrugations 60.

One side of the casing 35 is provided with an aperture or light gate 61 for the optical path for reproduction of the visual images on the film and an aperture or light gate 62 for the light path used for the sound reproducing system. An aperture 63 is provided for the operation of mechanism imparting intermittent movement to the film. A spring pressed pressure plate 64 serves to guide a film past the apertures 61 and 63 and a similar plate 65 guides said film past aperture 62. Apertures 66 and 67 are provided in the opposite side of the casing 35 directly opposite apertures 61 and 62 respectively.

In threading a magazine, the plate 48 is first removed by turning the latches 49. An endless roll of film 68, in which the portions leaving the inner and outer edges of the roll are joined to form a loop, is then placed over the receiver 59 and over a separating roller 69 which is rotatably mounted on the plate 39. The innermost turn of the roll is passed between the receiver 59 and the roller 69 as shown at 70, sufficient film is drawn from the inner and outer turns for threading purposes and the plate 48 is then replaced and locked in position by the latches 49 with the film issuing from the inner edge of the roll 68 passing through an opening 71 therein and the portion issuing from the outer edge passing through a slot 72 in the plate 44. The loop of film so formed is threaded first about a roller 73 rotatably mounted on a downwardly bent ear 74 on the plate 48 and thence about the drive sprocket 56. The film is held in contact with the drive sprocket by rollers 75 and 76. The pressure plate 64 is then pressed back and the film inserted in the raceway between said plate and the wall of casing 35, an untensioned loop 77 being formed between said sprocket and raceway. The film is then led about sprocket 58 and is held in contact with the same by rollers 78 and 79. Next the film is placed in the raceway between pressure plate 65 and the wall of the casing, untensioned loops 80 and 81 being provided as shown in Fig. 5. The film is then trained about a roller 82 and then about sprocket 57 and is held in contact therewith by rollers 83 and 84. The remaining portion of the film is passed over roller 85, which is mounted on an ear 86 inwardly bent from the plate 44 at the proper angle to guide the film through the slot 72 back into compartment 42 where it is led to the outer edge of the roll 68 by rollers 87 and 88. The cover 38 is then secured in place and the magazine is ready for use.

It will be apparent that the entire threading operation may be accomplished without breaking and splicing the film and that when once threaded all of the necessary movements may be imparted to the film by meshing the gear 55 with a suitable power driven gear. The resulting movement of the drive sprockets 56, 57 and 58 continuously draws the film from the inner edge of the roll 68, moves the same past the several apertures and rewinds it on the outer edge of the roll. The provision of the separating roller 69 and the frusto-conical shape of the receiver 59 facilitate the removal of the inner turn of film from the roll. A guard member 89 bridging the opening 68 in plate 48 prevents the film at that point from entering the light path between apertures 66 and 61. If desired, the light paths may be defined by channel shaped members 90 and 91 secured to the inner surface of the cover 38 and serving to prevent the entrance of stray light rays to the light paths.

Magazine carriage

The several magazines 34 are mounted in a carriage, best seen in Figs. 2 and 3 and consisting of a pair of horizontally arranged rods 92 and 93 having secured thereto a pair of magazine engaging bars 94 and 95 secured together by vertical members 96 to form a rigid framework. The bars 92 and 93 are slidably supported in lugs 97 formed on the housing 24. The bar 95 carries a plurality of dowels 98 properly positioned to enter suitable recesses formed in the bottom plates 37 of the magazines. The bar 94 carries a plurality of vertically slidable pins 99 adapted to enter similar recesses in the top plates 36 of the magazines. Two of the dowels 98 and two of the pins 99 are preferably supplied for each magazine. A leaf spring 100 is secured to the bar 94 at the position for each magazine by means of a screw 101 and each of said springs presses downwardly on a shoulder formed on the corresponding pins 99. Each pair of pins 99 is provided with a lever 102 fulcrumed on the top of the bar 94 and having arms 103 engaging the heads of the pins 99. By this means, the pins may be withdrawn from engagement with the magazine by pressing downwardly on the outer end 104 of the lever 202. The magazine may then be lifted slightly to clear the dowels 98 and may be easily withdrawn. A similar operation is performed when a new magazine is to be put in place. Each magazine is thus accurately positioned on the carriage and may be easily removed and replaced.

The upper surface of the rod 93 is provided with rack teeth 105 which mesh with a pinion 106 (Fig. 4) mounted on a stub shaft 107 extending within the casing 24. The stub shaft 107 is rotated by means to be hereinafter described and this rotation moves the magazine carriage to bring any desired magazine into operative position with respect to the projector housing 23. When so positioned, the beam of light from a projector lamp 108 within the housing 23 is projected through a suitable lense system 109 in said housing and thence through the aperture 66 in the magazine, through the film at the aperture 61 and through suitable lenses contained in the optical system 26 to the mirrors 27 and 28 and the screen 29. At the same time, light from an exciter lamp 110 within the housing 23 is projected through a lens 111, through the aperture 67 in the magazine, through a lens 112 contained in the magazine and thence through the film at the aperture 62 to a photo-electric cell 113 (Fig. 2). The photo-electric cell is mounted on a bracket 114 within the housing 24 and is shown in Fig. 2 but is removed from Fig. 3 to show other parts in detail.

*Power supply for magazine movements and for projector operation*

Power for operating the magazine carriage to place the magazine in operative position and for operating the projection mechanism is supplied from the motor 25 which drives a shaft 115 journaled on suitable bearings within the housing 24. The shaft 115 has formed therein a worm thread 116 meshing with a worm gear 117 mounted on a main shaft 118 which is journaled in bearing members 119 and 120 within the housing 24. The main shaft 118 has splined thereto at one end a clutch collar 124 having clutch faces adapted to mesh with similar faces formed on beveled gears 122 and 123. The beveled gear 123 is mounted for free rotation on the shaft 118. The beveled gear 122 is secured to a stub shaft 126 journaled in a bearing member 121. The gears 122 and 123 both mesh with a beveled gear 125 mounted on the stub shaft 107 (Fig. 4). The shaft 118 is continuously rotated by the motor 25 in the clockwise direction, referring to Fig. 4. Thus, when the clutch collar 124 is moved to the right in Fig. 2 to engage the gear 123 the magazine carriage is moved to the right. When the clutch collar 124 is moved to the left to engage the gear 122, the magazine carriage is moved to the left.

The main shaft 118 has freely mounted thereon a pair of gears 127 and 128 each of which is provided with a hub having a clutch face formed thereon. A spacing collar 129 is secured to the shaft 118 to confine gear 127 between said collar and the bearing member 119 and to confine the gear 128 between said collar and a collar 130 which is likewise secured to the shaft 118. Longitudinal movement of said gears is thus prevented.

A clutch sleeve 131 is splined to the collar 129 and has clutch faces adapted to engage those on the hubs of the gears 127 and 128. When moved to the right in Fig. 2, the clutch sleeve 131 couples the gear 127 to the main shaft 118 to drive a cam shaft 132 by means of a gear 133 secured to said cam shaft and meshing with the gear 127. The cam shaft 132 carries a number of cams used to control the operation of various electrical and mechanical parts to be described hereinafter. When moved to the left in Fig. 2, the clutch sleeve 131 couples the gear 128 to the main shaft 118 to operate the projection mechanism.

*Projector operating mechanism*

The mechanism for coupling the driving gears 55 of the magazines to the gear 128 is mounted upon a swingable frame 134, best seen in Figs. 2 and 3. Said frame is freely mounted on a shaft 135 which is in turn journaled in suitable bearings on the casing 24. The frame is normally urged to the right in Fig. 3 by means of a tension spring 136 secured thereto and anchored to a pin 137 carried by the casing 24. Movement in the opposite direction is limited by an adjusting screw 138. The frame 134 carries at its lower end an arm 139 on which there is mounted a roller 140 engaging a cam 141 secured to the cam shaft 132. Said cam, in the rotation of the shaft 132, controls the swinging movement of the frame 134 about its pivot shaft 135.

The frame 134 has journaled near the lower end thereof a stub shaft 142 to which there is secured a gear 143 adapted to mesh with the gear 128. The gear 143 is properly positioned to engage the gear 55 of whichever magazine is in projecting position. This may occur when the frame 134 is moved by the cam 141 to the position shown in Fig. 3 and is held by said cam against the stop 138. When the cam 141 has been moved to the position permitting the spring 136 to move the frame 134 to the right, the gear 143 is withdrawn from engagement with the gear 55 and is likewise withdrawn from the path of movement of the magazines 34.

The frame 134 carries a pair of bearing brackets 144 in which there is journaled a shaft 145 having secured thereto a pinion 146 and a shutter 147. The shutter 147 is of the usual form used with motion picture apparatus and is positioned to cut off the light passing through the aperture 61 of the magazine at periodic intervals determined by its speed of rotation. The shutter is driven by means of a pinion 148 secured to the shaft 135 and meshing with the pinion 146. The shaft 135 also carries a sprocket about which there is trained a sprocket chain 149 which is likewise trained about a sprocket 150 carried upon the stub shaft 142.

The frame 134 also has journaled thereon a sprocket 151 adapted to project into the aperture 63 of the magazine when the frame 134 is swung to the operating position of Fig. 3. Said sprocket is adapted to engage the usual sprocket openings in the film and is intermittently driven from the chain 149 by means of a sprocket 152 engaging said chain and a common form of geneva movement driven by said sprocket and indicated generally at 153 in Fig. 3.

By means of the mechanism just described, the operating parts of any magazine may be coupled to the power source by swinging the frame 134 to the left in Fig. 3 under the control of the cam 141. At the same time, the sprocket 151 is caused to engage the film to impart the necessary intermittent motion thereto while the shutter 147 is rotated in timed relation to the operation of the geneva movement 153 to cut the optical light path during each intermittent movement of the film.

*Magazine clutch operating mechanism*

The clutch collar 124 which controls the movement of the magazine carriage is operated by a yoke 154 which is secured to a rod 155 in turn slidably supported on the bearing members 120 and 121. The rod 155 has one end projecting into a solenoid S1 and serves as a plunger which may be moved to the right in Fig. 2 and Fig. 7 by actuation of said solenoid. The rod 155 has slidably mounted thereon a collar 156 against which the yoke member 154 is normally pressed by a compression spring 157 abutting against the yoke member and against the bearing member 120. A pin 158 projects downwardly from the collar 156 and engages one arm of a lever 159, the shape of which is best seen in Fig. 7. Said lever has an upturned arm 160 which embraces a slidable rod 161 mounted in the casing 24 and extending through the opposite sides thereof. Rotation of said rod is prevented by a key 161a engaging a suitable keyway in the frame 24. Said rod carries collars 162 and compression springs 163 and 164 interposed between said collars and the arm 160. The lever 159 also has an upturned arm 165 adapted to engage a pin 166 on the underside of the rod 161. The lever 159 is pivotally mounted at 167 and the movement thereof about its pivot point is limited by stop pins 168 and 169. The magazine carriage carries downwardly projecting arms 170 and 171 adapted to engage the opposite ends of the rod 161 in the movement of the carriage. The rod 155 carries at its outer end an arm 172 adapted to engage a notch 173 in a disc 174 secured to the stub shaft 126 (Figs. 2 and 9).

In the operation of the apparatus just described the parts are normally in the position shown in Fig. 7 in which the rod 155 is held against the action of spring 157 by the engagement of the arm 165 with the pin 166. In this position the clutch collar 124 is centrally located between the gears 122 and 123 and the arm 172 is in engagement with the notch 173 to prevent movement of the magazine carriage.

With the parts in this position, movement of the magazine carriage to the right may be started by a momentary actuation of the solenoid S1 which draws the bar 155 and the yoke 154 to the right to engage the clutch 124 with gear 123 and which withdraws the arm 172 from the notch 173. This movement of the carriage normally continues for at least one revolution of the stub shaft 126, during which the arm 172 engages the inner face of the disc 174 and thus maintains the clutch engagement even though solenoid S1 may be deenergized. One revolution of the stub shaft 126 corresponds to a movement of the magazine carriage equal to the spacing between adjacent gears 55 and thus brings the next successive magazine to operating position. If at the end of one revolution solenoid S1 is not energized, the arm 172 may reenter the notch 173 and in so doing permits the spring 157 to return the clutch collar 124 to the neutral position. If, however, the solenoid S1 is energized at the end of one revolution of the shaft 126, it overcomes the force of spring 157 and permits the movement of the magazine to continue for at least one more revolution of the shaft 126.

When the magazine carriage has progressed to a point near the limit of its movement to the right, the arm 170 strikes the end of the rod 161. The rod 161 is moved to the right sufficiently to cause the pin 166 to clear the lever arm 165 and at the same time, the spring 163 is compressed to urge the lever 159 in the clockwise direction. When the pin 166 clears the lever 165, the lever 159 is moved against the stop pin 169 and thus moves the collar 156 to the left. Preferably, this occurs just before the notch 173 reaches the arm 172, whereupon the spring 157 may move the rod 155 to the left bringing the yoke 154 against the collar 156 in its new position and passing the arm 172 completely through the notch 173. This movement of the yoke 154 engages the clutch collar 124 with the gear 122 and starts the return movement of the magazine carriage to the left.

During the return movement of the carriage, the pressure on the rod 161 is first released, permitting the pin 166 to return to the path of movement of the arm 165. However, said pin is now on the opposite side of the arm 165 and thus restrains movement of the lever 159 in the counterclockwise rather than the clockwise direction. Normally during the return movement, the solenoid S1 is not energized so that return movement is made without interruption until the arm 171 strikes the opposite end of the rod 161. When this occurs, the rod is pressed to the left sufficiently for the pin 166 to clear the arm 165 while spring 164 is compressed to urge the lever 159 in the counterclockwise direction. Preferably, pin 166 clears the arm 165 just as the notch 173 reaches the arm 172. When this occurs, the pressure on the spring 164 is sufficient to rock the lever 159, to move the collar 156 and to compress the spring 157. This movement is stopped by the stop pin 168 with the clutch collar 124 in the neutral position and with the arm 172 in the notch 173 preventing further movement of the magazine carriage. If, however, the solenoid S1 is energized at this time, it may draw the bar 155 to the right and thus commence movement of the carriage to the right, as previously described.

Briefly summarizing the operation of the magazine carriage, movement to the right may be started by a momentary actuation of the solenoid S1 and may be stopped with any one of the magazines in projecting position if said solenoid is not energized when the particular magazine reaches that position. When the complete travel to the right has been accomplished, the clutch yoke 124 is automatically operated to reverse the direction of movement and to complete the left hand movement uninterruptedly. At the end of the reverse movement, the parts are automatically reset to provide for another forward movement if or when solenoid S1 is again engaged.

*Control mechanism for cam shaft and projector clutch*

Control of the clutch sleeve 131 for operating the projection mechanism and cam shaft 132 is accomplished by means of a pair of solenoids S2 and S3 (Figs. 2, 7 and 9). Said solenoids are fitted with a common plunger 175 having a pin and slot connection 176 with the forked end of a lever 177 which is pivotally mounted at 178. The opposite end of said lever is provided with a fork 179 engaging the sleeve 131 (Fig. 8). The lever 177 has a projection 180 carrying a pin 181 operating in a V-shaped opening 182 (Figs. 7 and 13) in a lever 183. The lever 183 is pivoted at 184 and urged in the clockwise direction by a tension spring 185 anchored to a stationary pin 186. A cam 187 mounted on a slidable rod 188 engages a recess 187a in the side of the lever 183 as best seen in Fig. 7. The rod 188 is guided in a bearing 189 and has its opposite end connected to a lever 190 secured on a short shaft 191. The shaft 191 also has secured thereto a lever 192 connected by a link 193 with the clutch yoke 154.

With the parts in the position shown in Fig. 7, it is assumed that the solenoid S2 has been actuated and has moved lever 177 to engage the sleeve 131 with the clutch face of gear 127 to turn the cam shaft 132. In this position the pin 181 rests in the opening 182 in the position shown in Fig. 7 and indicated by broken lines 181a in Fig. 13. The force of spring 185 exerted thereon thus holds clutch sleeve 131 in engagement with gear 127 even though solenoid S2 may be deenergized. If solenoid S3 is now energized, its force is sufficient to overcome the tension of spring 185 and to move the sleeve 131 into engagement with the clutch face of gear 128. In this movement the pin 181 is moved from one leg to the other of the V-shaped opening 182 and is held by the spring 185 in its new position indicated by broken lines 181b in Fig. 13. Thus either solenoid when momentarily actuated, may move the clutch sleeve 131 to engage one of the gears 127 or 128 and in either position the sleeve is held in place by spring 185.

As long as the clutch collar 124 is in neutral position the cam 187 is in the recess 187a and the movements of sleeve 131 just described may take place. However, when the collar 124 is moved in either direction from its neutral position the cam 187 is moved to the right or left and operates upon the faces of the recess 187a to move lever 183 in a counterclockwise direction against the tension of spring 185. In this movement, the pin 181 is drawn to the point of the V-shaped opening 182 as shown at 181c in Fig. 13 and the sleeve 131 is moved thereby to a neutral position between the clutch faces of gears 127 and 128. The neutral position of sleeve 131 is maintained until collar 124 is restored to its neutral position. When this occurs, cam 187 is restored to recess 187a and spring 185 is free to move lever 183. In this movement of the lever, the pin 181 is struck by the portion 182a of the wall of opening 182. This portion is shaped as shown in Fig. 13 to move the pin 181 to the position 181a and thus to move clutch sleeve 131 into engagement with gear 127.

Briefly summarizing the operation of clutch sleeve 131, it may be moved to operate the cam shaft by a momentary actuation of solenoid S2 and may be moved to operate the projector parts by a momentary actuation of solenoid S3. It is moved to a neutral position and locked in that position each time the clutch collar 124 is moved to operate the magazine carriage. Thus neither the cam shaft nor the projector parts may be operated while the magazine carriage is in motion. When the movement of the magazine carriage is stopped, sleeve 131 is automatically moved to connect the cam shaft 132 to the main shaft 118.

*Pre-selector mechanism*

The selector unit for preselecting the film to be shown is particularly illustrated in Figs. 10 and 11. It includes a switch box 194 containing a number of electrical switches operated by push buttons 195a, 195b, 195c, 195d and 195e. Said push buttons are accessible to the operator at the front of the machine and extend through the switch box 194, as shown in Fig. 10. The switches operated by the push buttons are described in more detail in connection with the wiring diagram, Fig. 9. On the rear face of the switch box 194, there is mounted a ring 196 of insulation material carrying contact points 197a, 197b, 197c, 197d and 197e. Said contact points are connected to the switches within the box 194 and are engageable by a leaf spring contact finger 198 which is mounted on an arm 199 and suitably insulated therefrom. The arm 199 is secured to a shaft 200 which, as best seen in Fig. 1, is downwardly inclined and enters the housing 24. Within the housing 24 the lower end of the shaft 200 rests in a bearing 201 which is formed on a bridge 202 spanning the bearing members 120 and 121. The said bearing and bridge are shown in Fig. 2 but the shaft 200 is omitted for the sake of clearness. The shaft 200 is longitudinally slidable in its bearings and is held downwardly against its seat in the bearing 201 by a compression spring 203 (Fig. 10) which bears against the switch box 194 and against the arm 199. Referring now to Fig. 4, the shaft 200 carries a gear 204, the lower face of which is engageable by a cam 205 mounted on the cam shaft 132. At a predetermined point in the cycle of operation the cam 205 strikes the gear 204 and raises the shaft 200 to press the arm 199 against one of the projecting push buttons, as for example, the push button 195e shown in Fig. 10.

Referring again to Fig. 4, the gear 204 meshes with a spline 206 formed on a shaft 207 mounted in a bearing 208 formed on the bridge 202. The lower end of the shaft 207 carries a bevel gear 209 which meshes with the bevel gears 122 and 123. By means of the construction just described, the shaft 200 is rotated as the magazine carriage is moved. The proportion of the parts is such that whenever one of the magazines is in the projecting position, the contact finger 198 is in engagement with the contact point 197 which corresponds to that magazine and at the same time, the arm 199 is in register with the push button 195 corresponding to the same magazine. Thus the operation of the cam 205 serves to restore to normal position the push button corresponding to the particular magazine which is located at that instant in the projecting position. Manual means for restoring the push buttons are also provided but form no part of the invention and are not shown in the drawings.

*Electric switches*

The several electric switches shown in Fig. 9 and their operating mechanism will be described before tracing the electrical circuits connecting the same.

A switch P1 is normally open and is momentarily closed by the operation of the coin receiver 32 in a well known manner each time a coin or other token is inserted.

A switch P2 is operated by a cam 210 on the cam shaft 132. Said switch is open in the position assumed by said shaft when the machine is idle (as shown in Fig. 9), but is closed by its cam 210 during other parts of the operating cycle.

A switch P3 is operated by a cam 211 on the cam shaft 132 and is closed thereby during a predetermined portion of each rotation of the cam shaft.

A switch P4 is closed momentarily and immediately reopened once in each revolution of the cam shaft 132. The operation of the switch is initiated by the action of a cam 212 on said shaft, but the completion of the closing and reopening of the switch is independent of further movement of the cam and cam shaft. The mechanism by which this operation is accomplished is shown in detail in Fig. 12. The cam 212 is provided with a relatively sharp projection 214 and with an outwardly extending portion 215 arranged in a different plane. A dog 216 of insulation material is mounted on a stationary bracket 217 by means of a pin 218 operating in a slotted opening 219. The upper end of the dog is provided with a nose 220 and a projecting ear 221. The nose 220 is located in the plane of the projection 214 while the ear 221 is located in the plane of the portion 215 of the cam. The dog 216 is urged downwardly by a spring 222 which is offset as shown in Fig. 12 to hold the nose 220 against the cam. The dog is provided with a projection 223 adapted to strike a curved portion or hump 224 on one of the leaves of the switch P4. The switch P4 normally stands in the open position.

In the rotation of the cam shaft 132 in the direction of the arrow in Fig. 12, the projection 214 first strikes the nose 220 and lifts the dog 216. In this movement, the nose of the dog is held against the cam by the spring 222 and the projection 223 may pass the hump 224 without striking the same. In the further rotation of the cam shaft 132 the portion 215 of the cam comes into position beneath the ear 221. When the rotation has progressed sufficiently for the projection 214 to pass from beneath the nose 220, the dog 216 is pulled downwardly by spring 222, the ear 221 strikes the cam portion 215 and the dog is pressed outwardly thereby to engage the projection 223 with the hump 22 in passing. The downward movement of the dog 216 thus momentarily closes the switch P4 while the upward movement of the dog has no effect upon the switch. The closing of the switch is initiated when projection 214 on the cam leaves the nose 220 but the closing and immediate reopening are accomplished by the action of the spring 222.

A switch P5 is similarly operated by similar mechanism, the action of which is initiated by a cam 225 on the shaft 132.

A switch P6 is operated by a projection carried by the lever 177 and shown only in Fig. 9. Said switch is closed only when said lever is held in position to engage the sleeve 131 with gear 128 to operate the projection mechanism.

A switch P7 is operated by a projection carried by the arm 172. Said switch is normally closed but is opened by said arm when clutch sleeve 124 has been moved to the left to engage gear 122 for return movement of the magazine carriage.

A switch P8 is operated by a pin 226 carried by the disc 174 and is closed only when said disc is properly positioned for the arm 172 to enter the slot 173 therein.

A switch P9 (Fig. 3 and Fig. 9) is suitably mounted within the casing 24 and is operated by a pin 227 carried by a bell crank lever 228. Said lever is pivotally mounted at 229 and carries a roller 230 adapted to project into an aperture 231 in the film magazine (Fig. 5) and to engage the film as it passes said aperture. The pressure plate 64 within the magazine is provided with a central recess 232 immediately behind said aperture. The lever 228 is urged downwardly by a spring 233 to hold the roller against the film and may be moved upwardly to retract the roller from the magazine by operation of a projection 234 on the pivoted frame 134. During the showing of the film the roller is held in engagement with the film and the switch P9 is in the open position. Near the end of the subject matter constituting a complete showing of the film there is provided a suitable aperture in the film itself. When this aperture reaches the roller 230 said roller may enter the recess 232 and the consequent movement of lever 228 permits switch P9 to be closed. Said switch is immediately reopened when said aperture has passed. Thus the switch P9 is momentarily closed at the end of each showing of a film and is then reopened.

A master switch P10 is operated by a well known ratchet form of counting device contained in a switch box 235. The details of said device need not be described in detail. It is sufficient to state that the switch P10 normally remains open until a solenoid S4 is actuated one or more times. Upon actuation of said solenoid the ratchet mechanism closes switch P10 and maintains the same in closed position until a lever 236 has been operated as many times as the solenoid has been actuated. The lever 236 is connected by a link 237 with the pivoted frame 134 (Fig. 3) and is thus operated each time a film is shown.

Each of the selector push buttons 195a, etc., has associated therewith a pair of switches P11a and P12a, etc., the first of which is normally closed and the second is normally open. When one of said buttons is pressed, its switch P11 is opened and its switch P12 is closed. Said switches remain in the latter positions until their push button is restored to normal position.

Power supply

Electric power for operation of the apparatus is supplied from a suitable source on power mains 238 and 239 the several branches of which are connected as shown in Fig. 9. A transformer T has primary windings connected directly to the mains 238 and 239. The secondary windings of said transformer supply power at a suitable lower voltage to conductors 240 and 241 for operating certain of the control circuits. The remainder of the wiring can best be described in connection with the operating cycle of the apparatus. In tracing the several circuits, conductors are referred to by reference number only.

Cycle of operations

In the idle condition of the apparatus no circuits are complete except the primary circuit of transformer T and a circuit for a pilot light 243 which is connected across the mains 238 and 239 and which indicates that the apparatus is in condition for operation. The clutch sleeve 131 is engaged with the gear 127 for operation of the cam shaft 132 and the clutch sleeve 124 is in neutral position. The cam 141 is in position to permit the pivoted frame 134 to be withdrawn by spring 136 to disengage the projection apparatus. The several electric switches are open or closed as indicated in Fig. 9.

With the parts in this condition, the operator may press one or more of the selector push buttons or may refrain from making a selection if he so desires. In either case the receipt of a coin and operation of the coin receiver 32 then momentarily closes switch P1 and completes a circuit for solenoid S4 (T, 240, P1, 244, S4, 241, T). The momentary actuation of solenoid S4 causes the closing of the master switch P10 which connects the power main 238 with a distributory conductor 245, branches of which lead to the motor 25 and amplifier 30 whose opposite terminals are connected to the power main 239. The motor 25 is thus started and the amplifier and speaker are placed in condition for operation.

Since clutch sleeve 131 is in engagement with gear 127, the operation of the motor 25 starts the rotation of the cam shaft 132 and immediately closes switch P2. The latter switch is connected in parallel with the master switch P10 and thus retains the circuit for the motor and amplifier until the cam shaft has made one complete revolution even though the master switch may be opened before said revolution is complete.

Substantially simultaneously with the closing of switch P2, cam 212 releases the dog 216 to close switch P4 momentarily, completing a circuit for solenoid S1 (T, 240, P4, 246, S1, 241, T). The momentary actuation of solenoid S1 shifts clutch collar 124 into engagement with gear 123 to start the forward movement of the magazine carrier and also throws sleeve 131 to the neutral position to stop the cam shaft as previously described. At the same time, switch P3 is closed with no immediate effect and remains closed during the time that the cam shaft is stopped.

Assuming that the last selection shown corresponded with the push button 195b and that push button 195d has been pressed to select its corresponding film for the next showing, then the contact finger 198 is in engagement with contact button 197b, switch P11d is open and switch P12d is closed. During the time that shaft 126 makes a complete revolution to move the next magazine into projecting position, the finger 198 moves from the button 197b to the button 197c. When this revolution is finished, a circuit for solenoid S1 is completed (T, 240, P3, 247, P8, 248, P7, 249, P12d, 250, P11c, 198, 251, S1, 241, T). The resulting actuation of solenoid S1 prevents the arm 172 from entering the notch 173 to stop the magazine carriage movement. Said movement therefore continues for another complete revolution of shaft 126 during which the selected magazine is brought to projecting position and contact finger 198 reaches the button 197d. Since switch P11d is open no circuit is completed for solenoid S1 and the arm 172 may then enter the notch 173 and permit the clutch collar 124 to move to the neutral position, stopping the magazine carriage with the selected magazine in projecting position. By this means the carriage movement is carried past any magazine whose push button has not been pressed and whose switch P11 is therefore closed and is stopped when a magazine is reached whose push button has been pressed and whose switch P11 is open.

Assuming that the magazine corresponding to push button 195a has been selected, the forward movement of the carriage continues for one step beyond the position of the magazine corresponding to the last push button 195e whereupon collar 124 is mechanically shifted to engage gear 122 as previously described and the reverse movement of the carriage is begun. During the reverse movement switch P7 is open so that solenoid S1 cannot be energized and cannot interfere with the return movement. At the completion of the return movement, arm 172 again enters the notch 173 with contact finger 198 in engagement with button 197a. Since switch P11a is open, the movement of the carriage is stopped.

Assuming that no selection has been made, all of the P12 switches are open and no circuit for solenoid S1 can be completed. The magazine carriage is then moved one step only to bring the next magazine into projecting position.

When the magazine carriage has been stopped with the proper magazine in position and clutch collar 124 has returned to the neutral position, the clutch sleeve 131 is mechanically moved to reengage gear 127 as previously described. The rotation of cam shaft 132 is then resumed. During this movement switch P3 is opened, after which the cam 205 may operate to restore the selected push button to normal position without completing any circuit for solenoid S1. During the same movement, cam 141 operates to swing the frame 134 into the position shown in Fig. 3 in which position gear 143 engages the gear 55 of the selected magazine, intermittent sprocket 151 engages the film and roller 230 also engages the film. The movement of the frame 134 also operates link 237 to check one play on the ratchet mechanism associated with the master switch P10. If no further selections have been paid for the master switch is opened but the operation continues since switch P2 is closed.

At the end of this cam operation cam 225 operates its associated dog to close momentarily the switch P5 and complete a circuit for solenoid S3 (T, 240, P5, 252, S3, 241, T). The operation of said solenoid throws sleeve 131 into engagement with gear 128 and starts the operation of the projection mechanism. At the same time switch P6 is closed to connect the projecting lamp 108 and exciter lamp 113 between the distributory conductor 245 and the power main 239 and thus to illuminate said lamps.

When the showing of the film is completed, the roller 230 engages a suitable opening in the film and is momentarily moved to close switch P9 completing a circuit for solenoid S2 (T, 240, P9, 253, S2, 241, T). The action of solenoid S2 stops the operation of the projection mechanism, extinguishes the lamps 108 and 113 by opening switch P6 and reengages the sleeve 131 with gear 127 to resume the movement of the cam shaft 132.

During the resulting movement of the cam shaft, cam 141 operates to permit withdrawal of the frame 134 to the right in Fig. 3 and thus disengages gears 143 and 55 and disengages the sprocket 151 and roller 230 from the film, leaving the magazine clear for movement of the carriage. When a total cam shaft movement of one complete revolution has been made, switch P2 is opened. If no further selections have been paid for, the master switch P10 is also open and the motor and amplifier circuits are broken, stopping the apparatus in its original idle position. If payment for another selection has been made, the master switch P10 is closed and the opening of switch P2 has no effect. Another complete cycle of operations then takes place immediately.

The foregoing specification describes the invention in one of its preferred forms. The details thereof may be varied without departing from the scope of the invention as defined in the appended claims. For example, the apparatus is equally applicable to the production of silent pictures and to sound effects without pictures.

In the claims the term "sensible impression" is intended to include either sound or visible images or both, and a "projection apparatus" is intended to include a device adapted to produce either or both effects from a record carried by a film.

The invention claimed is:

1. Film manipulating mechanism for an automatic multi-film projecting apparatus having a light source and a translating device actuated by a beam of light from said source for reproducing sensible impressions recorded on a film intercepting said beam, said film manipulating mechanism including a plurality of magazines each containing an endless roll of film and each provided with a light gate in a wall thereof past which said film may be moved, film engaging members within each magazine adapted when actuated to draw the film from said roll, move the same past said gate and return the same to said roll, a magazine carriage upon which said magazines are mounted, carriage operating means adapted to move said carriage and to stop the same with the gate of one of said magazines in the path of said beam of light from said source, and means for actuating the film engaging members of the magazine so placed.

2. Film manipulating mechanism for an automatic multi-film projecting apparatus having a light source and a translating device actuated by a beam of light from said source for reproducing sensible impressions recorded on a film intercepting said beam, said film manipulating mechanism including a plurality of magazines each containing an endless roll of film and each provided with a light gate in a wall thereof past which said film may be moved, film moving means carried by each magazine and adapted when actuated to draw the film from said roll, move the same past said gate and rewind the same on said roll, carriage operating means adapted to move said carriage and to stop the same with the gate of one of said magazines in the path of said beam of light from said source, a movable member, actuating means for said film moving means carried by said member, and means for moving said member to engage said actuating means with the film moving means of the magazine so placed and to disengage the same to permit movement of the magazine carriage.

3. Film manipulating mechanism for an automatic multi-film projecting apparatus having a light source and a translating device actuated by a beam of light from said source for reproducing sensible impressions recorded on a film intercepting said beam, said film manipulating mechanism including a plurality of magazines each containing an endless roll of film and each provided with a light gate in a wall thereof past which said film may be moved, film engaging members within each magazine adapted when actuated to draw the film from said roll, move the same past said gate and return the same to said roll, a magazine carriage upon which said magazines are mounted, carriage operating means adapted to move said carriage and to stop the same with the gate of one of said magazines in the path of said beam of light from said source, means for actuating the film engaging members of the magazine so placed, a member adapted to impart intermittent movement to the portion of said film passing said gate, and means for moving said member into said magazine to engage said film and for retracting the same therefrom to permit movement of the magazine.

4. Film manipulating mechanism for an automatic multi-film projecting apparatus having a light source and a translating device actuated by a beam of light from said source for reproducing sensible impressions recorded on a film intercepting said beam, said film manipulating mechanism including a plurality of magazines each containing an endless roll of film and each provided with a light gate in a wall thereof past which said film may be moved, film moving means carried by each magazine and adapted when actuated to draw the film from said roll, move the same past said gate and rewind the same on said roll, a magazine carriage upon which said magazines are mounted, carriage operating means adapted to move said carriage and to stop the same with the gate of one of said magazines in the path of said beam of light from said source, a movable member, actuating means for said film moving means carried by said member, an intermittently driven element adapted to impart intermittent movement to the portion of said film passing said gate, said element being carried by said movable member, and means for moving said movable member to engage said actuating means with the film moving means of the magazine so placed and to engage said intermittently driven element with the film therein.

5. Film manipulating mechanism for an automatic multi-film projecting apparatus having a light source and a translating device actuated by a beam of light from said source for reproducing sensible impressions recorded on a film intercepting said beam, said film manipulating mechanism including a plurality of magazines each containing an endless roll of film and each provided with a light gate in a wall thereof past which said film may be moved, film engaging members within each magazine adapted when actuated to draw the film from said roll, move the same past said gate and return the same to said roll, a magazine carriage upon which said magazines are mounted, a manually controlled selector device, power driven carriage operating means for moving said carriage said means being controlled by said selector device to stop said carriage with the gate of a selected magazine in the path of the beam of light, and means for actuating the film engaging members of the selected magazine.

6. Film manipulating mechanism for an automatic multi-film projecting apparatus having a light source and a translating device actuated by a beam of light from said source for reproducing sensible impressions recorded on a film intercepting said beam, said film manipulating mechanism including a plurality of magazines each containing an endless roll of film and each provided with a light gate in a wall thereof past which said film may be moved, film moving means carried by each magazine and adapted when actuated to draw the film from said roll, move the same past said gate and rewind the same on said roll, a magazine carriage upon which said magazines are mounted, a manually controlled selector device, power driven carriage operating means for moving said carriage said power driven means being controlled by said selector device to stop said carriage with the gate of a selected magazine in the path of the beam of light, a movable member, actuating means for said film moving means carried by said member, and means for moving said member to engage said actuating means with the film moving means of the selected magazine and to disengage the same to permit movement of the magazine carriage.

7. Film manipulating mechanism for an automatic multi-film projecting apparatus having a light source and a translating device actuated by a beam of light from said source for reproducing sensible impressions recorded on a film intercepting said beam, said film manipulating mechanism including a movable magazine carriage, a plurality of magazines removably mounted thereon, each of said magazines containing an endless roll of film and each having a light gate through which said beam of light may pass when said carriage is properly positioned, film moving means carried by each magazine and adapted when actuated to draw the film from said roll, move the same past said gate and rewind the same on said roll, a movable member, actuating means for said film moving means carried by said member, a trigger engaging said film and actuatable thereby at a predetermined point in the movement of said film, and mechanism actuated by actuation of said trigger for moving said movable member to disengage said actuating means from said film moving means.

8. Film manipulating mechanism for an automatic multi-film projecting apparatus having a light source and a translating device actuated by a beam of light from said source for reproducing sensible impressions recorded on a film intercepting said beam, said film manipulating mechanism including a movable magazine carriage, a plurality of magazines removably mounted thereon, each of said magazines containing an endless roll of film and each having a light gate through which said beam of light may pass when said carriage is properly positioned, film moving means carried by each magazine and adapted when actuated to draw the film from said roll, move the same past said gate and rewind the same on said roll, a movable member, actuating means for said film moving means carried by said member, an intermittently driven element adapted to impart intermittent movement to the portion of said film passing said gate, said element being carried by said movable member, a trigger engaging said film and actuatable thereby at a predetermined point in the movement of said film, and mechanism actuated by actuation of said trigger for moving said movable member to disengage said actuating means from said film moving means and to disengage said intermittently driven element from said film.

9. Film manipulating mechanism for an automatic multi-film projecting apparatus having a light source and a translating device actuated by a beam of light from said source for reproducing sensible impressions recorded on a film intercepting said beam, said film manipulating mechanism including a movable magazine carriage, a plurality of magazines removably mounted thereon, each of said magazines containing an endless roll of film and each having a light gate through which said beam of light may pass when said carriage is properly positioned, film moving means carried by each magazine and adapted when actuated to draw the film from said roll, move the same past said gate and rewind the same on said roll, a movable member, actuating means for said film moving means carried by said member, a trigger engaging said film and actuatable thereby at a predetermined point in the movement of said film, mechanism actuated by actuation of said trigger for moving said movable member to disengage said actuating means from said film moving means, and means operated by movement of said movable member for disengaging said trigger from said film.

10. Magazine manipulating mechanism for an automatic multi-film projecting apparatus, said mechanism including a plurality of film magazines, a carriage on which said magazines are mounted, said carriage being movable to place each of said magazines in a projection position, a power source, power transmission means including a clutch engageable to connect said power source to move said carriage, a member movable with said carriage, a stop member engageable therewith and movable with movement of said clutch, said members being engageable to prevent movement of the carriage when each of said magazines is in the projection position and being engaged at other times to maintain said clutch in carriage moving engagement, and means for initially moving said stop member and clutch to initiate a movement of the carriage.

11. Magazine manipulating mechanism for an automatic multi-film projecting apparatus, said mechanism including a plurality of film magazines, a carriage on which said magazines are mounted, said carriage being movable to place each of said magazines in a projection position, a power source, power transmission means including a clutch engageable to connect said power source to move said carriage, a member movable with said carriage, a clutch retaining member engageable therewith when none of said magazines is in projection position and adapted when so engaged to retain said clutch in carriage moving engagement, and means for intially moving said clutch to initiate a movement of the carriage.

12. Magazine manipulating mechanism for an automatic multi-film projecting apparatus, said mechanism including a plurality of film magazines, a carriage on which said magazines are mounted, said carriage being movable to place each of said magazines in a projection position, a power source, power transmission means including a clutch engageable to connect said power source to move said carriage, a member movable with said carriage, a clutch retaining member engageable therewith when none of said magazines is in projection position and adapted when so engaged to retain said clutch in carriage moving engagement, said clutch retaining member being released by said movable member to permit disengagement of the clutch as each of said magazines reaches the projection position, and other means for retaining said clutch in carriage moving engagement when any but a selected magazine reaches the projection position.

13. Magazine manipulating mechanism for an automatic multi-film projecting apparatus, said mechanism including a plurality of film magazines, a reciprocable carriage on which said magazines are mounted, said carriage being movable to place each of said magazines in a projection position, a power source, power transmission means connecting said power source to move said carriage, said transmission means including clutch members engageable for forward and reverse movement of the carriage and having a neutral position in which carriage movement is stopped, a clutch operating member, a yielding member engaging said operating member and urging the same in the direction to engage said clutch members for reverse carriage movement, a stop member engaging said operating member and normally holding the same in the neutral position against the action of said yielding member, means for initially moving said operating member in oppositon to said yielding means to engage said clutch members for forward carriage movement and for thereafter retaining said clutch members so engaged during forward carriage movement, and reversing mechanism operated by movement of the carriage at the end of forward movement to move said stop member to a position permitting the action of said yielding means to engage said clutch members for reverse carriage movement and operated at the end of said reverse movement to return said stop member to normal position.

14. Magazine manipulating mechanism for an automatic multi-film projecting apparatus, said mechanism including a plurality of film magazines, a carriage on which said magazines are mounted, said carriage being movable to place each of said magazines in a projection position, a power source, power transmission means including a clutch engageable to connect said power source to move said carriage, film moving means adapted when actuated to move the film in the magazine at the projection station for reproduction of sensible impressions recorded thereon, actuating means engageable with said film moving means to actuate the same and disengageable therefrom to permit movement of the magazine carriage, a cam shaft, cam means associated with said cam shaft and adapted to control the engagement and disengagement of said actuating means with said film moving means, power transmission means including a second clutch engageable to connect said power source to operate said cam shaft, a mechanical interlock between said clutches by means of which said second clutch is disengaged when said first clutch is engaged, and means automatically reengaging said second clutch when said first clutch is disengaged.

15. Film manipulating mechanism for an automatic multi-film projection apparatus having a light source and a reproducing device actuated by a beam of light from said source for reproducing sensible impressions recorded on a film intercepting said beam, said film manipulating mechanism including a magazine carriage, a plurality of self-contained film magazine units detachably mounted on said carriage, each of said units being provided with means for storing a film therein, a light gate and film driving means adapted to move said film past said light gate wholly within said magazine unit, carriage operating means adapted to move said carriage to place the light gate of any one of said magazine units in the path of said beam of light from said light source, and means for actuating the film driving means of the magazine unit so placed.

16. Film manipulating mechanism for an automatic multi-film projection apparatus having a light source and a reproducing device actuated by a beam of light from said source for reproducing sensible impressions recorded on a film intercepting said beam, said film manipulating mechanism including a magazine carriage, a plurality of self-contained film magazine units detachably mounted on said carriage, each of said units being provided with means for storing a film therein, a light gate and film driving means adapted to move said film past said light gate wholly within said magazine unit, carriage operating means adapted to move said carriage to place the light gate of any one of said magazine units in the path of said beam of light from said light source, a movable member, actuating means for said film driving means carried by said member, and means for moving said member to engage said actuating means with the film driving means of the magazine unit so placed and to disengage the same to permit movement of the magazine.

17. Film manipulating mechanism for an automatic multi-film projection apparatus having a light source and a reproducing device actuated by a beam of light from said source for reproducing sensible impressions recorded on a film intercepting said beam, said film manipulating mechanism including a magazine carriage, a plurality of self-contained film magazine units detachably mounted on said carriage, each of said units being provided with means for storing a film therein, a light gate and film driving means adapted to move said film past said light gate wholly within said magazine unit, a manually controlled selector device, power driven carriage operating means for moving said carriage, said means being controlled by said selector device to stop said carriage with the light gate of a selected magazine in the path of the beam of light, and means for actuating the film driving means of the magazine unit so placed.

18. Film manipulating mechanism for an automatic multi-film projection apparatus having a light source and a reproducing device actuated by a beam of light from said source for reproducing sensible impressions recorded on a film intercepting said beam, said film manipulating mechanism including a magazine carriage, a plurality of self-contained film magazine units detachably mounted on said carriage, each of said units being provided with means for storing a film therein, a light gate and film driving means adapted to move said film past said light gate wholly within said magazine unit, carriage operating means adapted to move said carriage to place the light gate of any one of said magazine units in the path of said beam of light from said light source, a movable member, actuating means for said film driving means carried by said member, a trigger engaging said film and actuatable thereby at a predetermined point in the movement of said film, and mechanism actuated by actuation of said trigger for moving said movable member to disengage said actuating means from said film moving means.

PAUL U. LANNERD.

DISCLAIMER 2,214,468.—*Paul U. Lannerd*, North Tonawanda, N. Y. PROJECTION DEVICE. Patent dated September 10, 1940. Disclaimer filed July 3, 1943, by the inventor.

Hereby enters this disclaimer to claims 1, 5, 15, and 17 of said patent.

[*Official Gazette July 20, 1943.*]